(12) United States Patent
Ueyama et al.

(10) Patent No.: US 9,182,505 B2
(45) Date of Patent: Nov. 10, 2015

(54) SCINTILLATOR CRYSTAL AND RADIATION DETECTOR

(71) Applicant: CANON KABUSHIKI KAISHA, Tokyo (JP)

(72) Inventors: Ryoko Ueyama, Yokohama (JP); Nobuhiro Yasui, Yokohama (JP); Toru Den, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/497,129

(22) Filed: Sep. 25, 2014

(65) Prior Publication Data

US 2015/0090886 A1 Apr. 2, 2015

(30) Foreign Application Priority Data

Sep. 27, 2013 (JP) ................... 2013-201376

(51) Int. Cl.
*G01T 1/10* (2006.01)
*G01T 1/202* (2006.01)

(52) U.S. Cl.
CPC ...................... *G01T 1/202* (2013.01)

(58) Field of Classification Search
CPC ......... G01T 1/202; G01T 1/2018; G01T 1/20; G01T 1/2008
See application file for complete search history.

(56) References Cited

U.S. PATENT DOCUMENTS

2008/0023648 A1* 1/2008 Sakai et al. ................ 250/483.1

FOREIGN PATENT DOCUMENTS

JP 2012131964 A 7/2012

* cited by examiner

*Primary Examiner* — Kiho Kim
(74) *Attorney, Agent, or Firm* — Canon U.S.A. Inc., IP Division

(57) ABSTRACT

A scintillator crystal includes a plurality of first crystal phases and a second crystal phase located around the plurality of the first crystal phases, in which each of the plurality of the first crystal phases contains a sulfate, the second crystal phase contains an alkali halide that emits light by irradiation with radiation, and the refractive index of each of the first crystal phases is lower than the refractive index of the second crystal phase.

12 Claims, 5 Drawing Sheets

SCINTILLATOR CRYSTAL AND RADIATION DETECTOR

BACKGROUND OF THE INVENTION

1. Field of the Invention

The present invention relates to a scintillator crystal that emits light by irradiation with radiation and a radiation detector including the scintillator crystal.

2. Description of the Related Art

In an X-ray computed tomography (CT) scanner used in, for example, clinical practice, a scintillator receives X-rays passing through a subject, and light emitted from the scintillator is detected by photodetectors.

Japanese Patent Laid-Open No. 2012-131964 (US counterpart: U.S. Patent Application Publication No. 2012/0292516) discloses a scintillator crystal (phase-separated scintillator crystal) having a phase-separated structure including a plurality of columnar crystals (cylindrical phase) and a crystal phase (matrix phase) around the columnar crystals. In the scintillator crystal, a material constituting the cylindrical phase differs in refractive index from a material constituting the matrix phase. This imparts a light-guiding function to the scintillator crystal itself, thus inhibiting light crosstalk.

Japanese Patent Laid-Open No. 2012-131964 discloses that in the case of a scintillator crystal in which the amount of light emitted from the matrix phase is larger than that from the cylindrical phase when the phases are irradiated with radiation, the matrix phase may be composed of a material having a higher refractive index than the cylindrical phase. The reason for this is that in the case where the matrix phase is composed of a material having a higher refractive index, it is possible to more efficiently confine light generated in the matrix phase, thereby enhancing light-guiding properties.

In this specification, among phases constituting a phase-separated scintillator crystal, a phase composed of a material having a high refractive index is referred to as a "high-refractive-index phase", and a phase composed of a material having a low refractive index is referred to as a "low-refractive-index phase". The magnitude of the refractive index is a relative scale. When a phase is composed of a material having a higher refractive index than a material constituting a low-refractive-index phase, the phase is regarded as a high-refractive-index phase. In general, a lower refractive index ratio of the low-refractive-index phase to the high-refractive-index phase (low-refractive-index phase/high-refractive-index phase) may result in higher light-guiding properties because light can be confined in the high-refractive-index phase.

Japanese Patent Laid-Open No. 2012-131964 discloses NaCl—CsI and KCl—CsI as examples of a scintillator crystal in which the amount of light emitted from the matrix phase is larger than that from the cylindrical phase when the phases are irradiated with radiation and in which the matrix phase is a high-refractive-index phase.

However, it was found that in the scintillator crystals disclosed in Japanese Patent Laid-Open No. 2012-131964, a scintillator crystal having a lower refractive index absorbs a smaller amount of radiation and that the absorption of radiation is not sufficient, depending on the energy of radiation, in some cases. In the case where the scintillator crystal insufficiently absorbs radiation, a light-receiving device located downstream of the scintillator crystal can be damaged by radiation.

SUMMARY OF THE INVENTION

One disclosed aspect of the present invention provides a scintillator crystal including a plurality of first crystal phases and a second crystal phase located around the plurality of the first crystal phases, in which each of the plurality of the first crystal phases contains a sulfate, the second crystal phase contains an alkali halide that emits light by irradiation with radiation, and the refractive index of each of the first crystal phases is lower than the refractive index of the second crystal phase.

Further features of the present invention will become apparent from the following description of exemplary embodiments with reference to the attached drawings.

DESCRIPTION OF THE EMBODIMENTS

A scintillator crystal according to an embodiment is a scintillator crystal in which a larger amount of light emitted from a matrix phase is provided when phases are irradiated with radiation and in which the matrix phase is a high-refractive-index phase. The scintillator crystal achieves both a low refractive index ratio and high radiation absorptivity.

The scintillator crystal according to this embodiment has a phase-separated structure including a plurality of first crystal phases and a second crystal phase located around the plurality of the first crystal phases. Each of the plurality of the first crystal phases has a columnar crystal structure containing a sulfate and is also referred to as a cylindrical phase. The second crystal phase contains an alkali halide that emits light by irradiation with radiation, and the second crystal phase is also referred to as a matrix phase. The second crystal phase contains the alkali halide that emits light by irradiated with radiation and thus functions as a scintillator phase. The first crystal phases may or may not emit light when irradiated with radiation. When the first and second crystal phases are irradiated with radiation at the same intensity, the amount of light emitted from the second crystal phase per unit volume is larger than that of the first crystal phases. The refractive index of the first crystal phases is lower than that of the second crystal phase.

In this specification and in an embodiment of the present invention, the expression "that emits light by irradiation with radiation" includes photostimulated luminescence (trap sites of carriers generated by irradiation with radiation are excited by irradiation with light and emit light) in addition to typical scintillation (light emission by irradiation with radiation). A material that exhibits photostimulated luminescence is also referred to as a "scintillator". The expression "the refractive index of the first crystal phases is lower than that of the second crystal phase" indicates that the refractive index of a material constituting the first crystal phases is lower than that of a material constituting the second crystal phase.

The sulfate contained in the first crystal phases may be at least one of $Cs_2SO_4$, $Rb_2SO_4$, $K_2SO_4$, and $Na_2SO_4$. The alkali halide contained in the second crystal phase may be at least one of CsI, CsBr, and RbI.

Embodiments of the present invention will be described below with reference to the attached drawings.

Structure of Scintillator Crystal

Figure 1:
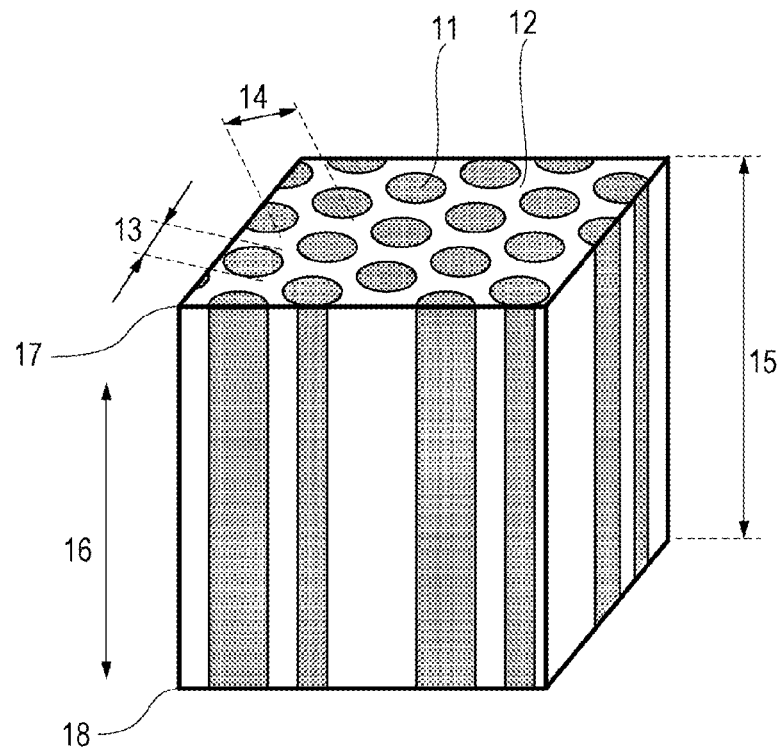
FIG. 1 is a schematic cross-sectional view of a scintillator crystal according to an embodiment.

FIG. 1 illustrates a schematic structure of a scintillator crystal according to an embodiment.

The phase-separated scintillator crystal according to this embodiment includes a plurality of first crystal phases 11 composed of unidirectional columnar crystals and a second crystal phase 12 which is located around the first crystal phases and in which side surfaces of the plural first crystal phases 11 are embedded. Each of the plural first crystal phases 11 is continuously present from a first surface (top surface) 17 to a second surface (undersurface) 18. The second crystal phase 12 is also continuously present from the first surface 17 to the second surface 18. The shape of the first crystal phases 11 is not limited to a round column and may be, for example, a polygonal column having a plurality of crystal faces. In this case, the polygonal column is not limited to a regular polygonal column. The first crystal phases may have a structure in which the plural cylindrical columns (polygonal columns) are arranged in the direction perpendicular to the axis or in the direction of the axis.

Each of the first crystal phases may have a diameter 13 of 50 nm or more and 30 µm or less. In the case where the shape of the first crystal phases are not a cylindrical column, both of the minimum diameter and the maximum diameter of each of the first crystal phases may be nm or more and 30 µm or less. The term "minimum diameter" indicates the minimum length among the lengths of segments each extending from one side to another side of each of the columnar crystals through the barycenter of each columnar crystal in a cross section of the scintillator crystal (cross section perpendicular to a direction to guide light). The maximum diameter indicates the maximum length among the lengths of the segments each extending from one side to another side of each of the columnar crystals through the barycenter of each columnar crystal.

A period 14 between the first crystal phases located adjacent to each other may be 500 nm or more and 50 µm or less. The expression "period between the first crystal phases" indicates a period between one first crystal phase and a first crystal phase closest to the first crystal phase on the first surface 17. In the case where the period of the first crystal phases is not constant, when the average period is 500 nm or more and 50 µm or less, the period 14 of the first crystal phases may be regarded as being 500 nm or more and 50 µm or less. The period need not be measured. For example, the period of the first crystal phases may be approximately calculated by counting the number of the first crystal phases present in a width of 1 mm and dividing 1 mm by the number. In the case where a radiation detector is formed of a combination of the scintillator crystal according to this embodiment and a photodetector, the scintillator crystal may have a structure in which the columnar crystals of the plural first crystal phases are arranged on a light-receiving region of a light-receiving device of the photodetector. In other words, the period of the first crystal phases may be equal to or less than half the size of a pixel of the detector. For example, in the case where a light-receiving region has a square shape with a side of 20 µm, the columnar crystals have a diameter of 5 µm and a period of 8 µm. Thus, structures having small dimensions may be combined together, depending on the size of the light-receiving region, regardless of the foregoing dimension ranges of the structures. The dimensions of the structure are determined by the selection of a material system and production conditions. The tendency will be described below. A photodetector array may be used as a photodetector.

The thickness 15 of the scintillator crystal may be adjusted to any thickness, partly depending on the production method. Light is guided by the total reflection of part of light generated in the second crystal phase at the boundaries between the first crystal phases and the second crystal phase. Thus, each of the first crystal phases may extend substantially continuously in a straight line throughout the thickness direction 16 of the first crystal phases. The term "thickness direction" refers to a direction in which the first surface and the second surface are connected. However, all the first crystal phases may not be continuous from the first surface to the second surface. Each of the first crystal phases may be discontinuous. Moreover, each of the first crystal phases may be branched, fused, and changed in diameter. Furthermore, each of the first crystal phases may not be straight but may contain a curved portion. While the first surface 17 is parallel to the second surface 18 in FIG. 1, the first crystal phases may be curved by an appropriate control of the direction of a solidification interface. Thus, the positional relationship between the first surface 17 and the second surface 18 may be freely selected as long as the first surface 17 is not flush with the second surface 18. FIG. 1 is merely a schematic drawing, and an embodiment of the present invention is not limited thereto.

Each of the first crystal phases may contain at least one of $Cs_2SO_4$ (cesium sulfate), $Rb_2SO_4$ (rubidium sulfate), $K_2SO_4$ (potassium sulfate), and $Na_2SO_4$ (sodium sulfate). Moreover, each of the first crystal phases may consist of $Cs_2SO_4$, $Rb_2SO_4$, $K_2SO_4$, or $Na_2SO_4$. However, each of the first crystal phases may further contain an additional material to the extent that the phase-separated structure is not substantially affected. The expression "the extent that the phase-separated structure is not substantially affected" indicates the extent to which, for example, a sulfate other than the material ($Cs_2SO_4$, $Rb_2SO_4$, $K_2SO_4$, or $Na_2SO_4$) contained in the first crystal phases forms a solid solution with the material contained in the first crystal phases. In the case of a material other than sulfates, the expression "the extent that the phase-separated structure is not substantially affected" indicates 1% by mole or less of the material contained in the first crystal phases.

The second crystal phase may contain at least one of CsI (cesium iodide), CsBr (cesium bromide), and RbI (rubidium iodide). Moreover, the second crystal phase may consist of CsI, CsBr, or RbI. However, the second crystal phase may further contain an additional material to the extent that the phase-separated structure is not substantially affected. The expression "the extent that the phase-separated structure is not substantially affected" indicates the extent to which, for example, an alkali halide other than the material (CsI, CsBr, or RbI) contained in the second crystal phase, the alkali halide being capable of emitting light by irradiation with radiation, forms a solid solution with the material contained in the second crystal phase. In the case of a material other than alkali halides that emit light by irradiation with radiation, the expression "the extent that the phase-separated structure is not substantially affected" indicates 1% by mole or less of the material contained in the second crystal phase.

The second crystal phase emits light by irradiation with radiation. To increase the luminous efficiency of the second crystal phase, a small amount of a component serving as a luminescent center may be added. A large number of components serving as the luminescent center may be selected, depending on the application purpose and so forth. A single element or a plurality of elements may be added. For example, the element may be selected from Cu, Ag, Au, Ga, In, Tl, Sn, Pb, Sb, and Bi, each having an $(ns)2$ electron configuration in an alkali halide, and Ce, Pr, Nd, Sm, Eu, Gd, Tb, Dy, Ho, Er, Tm, Yb, and Lu, which are rare-earth elements. In addition, Na may also be selected. From the viewpoint of achieving high luminance, at least one of Tl, In, and Ga serving as a luminescent center may be added to the second crystal phase. In the case where a component serving as the luminescent center is added, the component may be appropriately selected in consideration of requirements, such as the luminance, the light-emission wavelength, and the luminescent decay time.

The component serving as the luminescent center may be added to the second crystal phase in the optimal composition. The component serving as the luminescent center may also be added to the first crystal phases. In this case, the first crystal phases may or may not emit light. In the case where the second crystal phase is a high-refractive-index phase, one or more components serving as the luminescent centers may be added to the first crystal phases in order to generate short-wavelength light capable of exciting the second crystal phase in the first crystal phases by irradiation with radiation. In this case, the second crystal phase also emits light by irradiation with radiation.

In the phase-separated scintillator crystal according to this embodiment, the material contained in the first crystal phases and the material contained in the second crystal phase form a eutectic mixture having a eutectic structure to provide a phase-separated structure. The phase-separated structure formed by the eutectic mixture is referred to as a "eutectic phase-separated structure" in this specification. To form the eutectic phase-separated structure of the scintillator crystal, the composition ratio of the material contained in the first crystal phases and the second crystal phase may be a composition ratio (eutectic composition ratio) at a eutectic point described in Table 1. However, the first crystal phases and the second crystal phase may form a eutectic structure in the range of about ±5% by mole (−5% by mole or more and +5% by mole or less) with respect to the eutectic composition ratio described in Table 1, depending on the crystallization rate (solidification rate). Thus, within this range, the composition ratio of the materials contained in the first crystal phases and the second crystal phase is regarded as a eutectic composition ratio.

TABLE 1

| First crystal phase:second crystal phase | Eutectic composition [mol %] | Eutectic temperature [° C.] |
| --- | --- | --- |
| $Cs_2SO_4$:CsI | 13:87 | 584° C. |
| $Rb_2SO_4$:CsI | 15:85 | 561° C. |
| $K_2SO_4$:CsI | 15:85 | 534° C. |
| $Na_2SO_4$:CsI | 16:84 | 534° C. |
| $Cs_2SO_4$:CsBr | 11:89 | 588° C. |
| $Rb_2SO_4$:CsBr | 17:83 | 569° C. |
| $K_2SO_4$:CsBr | 15:85 | 562° C. |
| $Na_2SO_4$:CsBr | 23:77 | 586° C. |
| $Rb_2SO_4$:RbI | 11:89 | 612° C. |
| $K_2SO_4$:RbI | 14:86 | 611° C. |
| $Na_2SO_4$:RbI | 22:78 | 574° C. |

To form the scintillator crystal having a phase-separated structure as illustrated in the schematic drawing of FIG. 1, the scintillator crystal may be produced in such a manner that the composition ratio of the scintillator crystal falls within the range of ±5% by mole with respect to the composition ratio described in Table 1. In the case where the composition ratio of the melt deviates greatly from the eutectic composition ratio and where a eutectic mixture is not formed, one phase is first precipitated. This can be a factor of the disturbance of the structure from the viewpoint of the formation of the structure. In such a case, however, one phase is first precipitated, so that the composition ratio of the melt approaches the eutectic composition ratio, thereby forming a eutectic mixture in the course of the solidification. In this case, removal of a structure formed by the precipitation of one phase alone results in a scintillator crystal having a eutectic phase-separated structure.

The important properties of the scintillator having unidirectionality according to an embodiment of the present invention are light guiding properties. The light guiding properties are obtained by a difference in refractive index between the material contained in the first crystal phases 11 and the second crystal phase 12. The refractive index of the material contained in the first crystal phases 11 is also referred to as the "refractive index of the first crystal phases". The refractive index of the material contained in the second crystal phase 12 is also referred to as the "refractive index of the second crystal phase". Regarding the combinations of the materials contained in the first crystal phases 11 and the second crystal phase 12 described in Table 1, Table 2 describes refractive indices of the crystal phases.

TABLE 2

| Material system | Refractive index of first crystal phase | Refractive index of second crystal phase | Refractive index ratio of first crystal phase to second crystal phase | Density of low refractive index phase |
| --- | --- | --- | --- | --- |
| $Cs_2SO_4$—CsI | 1.56 | 1.80 | 0.87 | 4.26 |
| $Rb_2SO_4$—CsI | 1.51 | 1.80 | 0.84 | 3.65 |
| $K_2SO_4$—CsI | 1.50 | 1.80 | 0.83 | 2.67 |

TABLE 2-continued

| Material system | Refractive index of first crystal phase | Refractive index of second crystal phase | Refractive index ratio of first crystal phase to second crystal phase | Density of low refractive index phase |
|---|---|---|---|---|
| $Na_3SO_4$—CsI | 1.48 | 1.80 | 0.82 | 2.70 |
| $Cs_2SO_4$—CsBr | 1.56 | 1.70 | 0.92 | 4.26 |
| $Rb_2SO_4$—CsBr | 1.51 | 1.70 | 0.89 | 3.65 |
| $K_2SO_4$—CsBr | 1.50 | 1.70 | 0.88 | 2.67 |
| $Na_3SO_4$—CsBr | 1.48 | 1.70 | 0.87 | 2.70 |
| $Rb_2SO_4$—RbI | 1.56 | 1.61 | 0.94 | 3.65 |
| $K_2SO_4$—RbI | 1.50 | 1.61 | 0.93 | 2.67 |
| $Na_3SO_4$—RbI | 1.48 | 1.61 | 0.92 | 2.70 |

Note that refractive indices depend on wavelength and can be changed by an additive. Thus, the refractive indices described in this table are not strictly accurate. Table 2 is given in order to indicate that there is a difference in refractive index between the first and second crystal phases and that the refractive index ratio is lower than 1.

According to Snell's law, between materials having different refractive indices, when light is incident from a high-refractive-index medium to a low-refractive-index medium, the light should be totally reflected. When light is incident at a lower angle than the critical angle, the light should be reflected and refracted. Thus, in the phase-separated scintillator according to an embodiment of the present invention, the difference in refractive index (a refractive index ratio of lower than 1) as described in Table 2 indicates that there is a condition in which light does not diverge by the total reflection of the light in the high-refractive-index phase. In other words, light is refracted and reflected repeatedly, and is relatively confined and propagated through the high-refractive-index phase. Thus, the phase-separated scintillator with a refractive index ratio (=the refractive index of a low-refractive-index crystal phase (first crystal phase)/the refractive index of a high-refractive-index crystal phase (second crystal phase)) of less than 1, has superior light-guiding properties to a scintillator with a refractive index ratio of 1. Therefore, the refractive index ratio is preferably less than 1 and more preferably 0.94 or less. To be exact, reflection and scattering of scintillation light, the volume fraction of the first crystal phases, and so forth affect the light-guiding properties. In general, light is less likely to diverge at a lower refractive index ratio.

While the relationship between the refractive index ratio and the light-guiding properties has been described above, the properties of the phase-separated scintillator crystal are evaluated as being adequate or inadequate for intended use also in consideration of the efficiency of light emission due to radiation excitation. Thus, the relative merits of scintillator crystals are not determined only by the refractive index ratio. All the material systems described in Table 1 are important.

Figure 5:
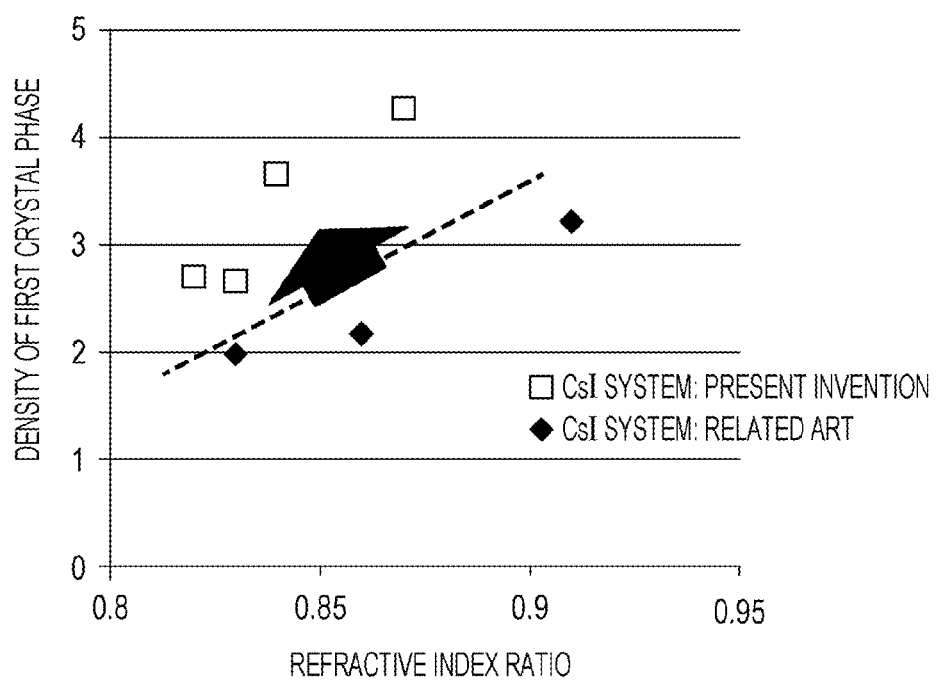
FIG. 5 is a graph plotting the densities of first crystal phases against the refractive index ratios of CsI-system phase-separated scintillator crystals.

In this embodiment, the first crystal phases contain a sulfate. FIG. 5 is a graph plotting the densities of first crystal phases against the refractive index ratios of CsI-system phase-separated scintillator crystals. Comparisons of the CsI-system crystals described in Table 1 with crystals of the related art having refractive index ratios similar to the CsI-system crystals reveal that the first crystal phases serving as the low-refractive-index phases in the CsI-system crystals described in Table 1 have higher densities. Note that all the second crystal phases are composed of CsI and thus have the same density.

For example, NaCl (refractive index: 1.55)-CsI (refractive index: 1.80) described in Japanese Patent Laid-Open No. 2012-131964 has a refractive index ratio of 0.86, and the first crystal phases have a density of 2.17. In contrast, Cs2SO4-CsI, which is an example of this embodiment, has a refractive index ratio of 0.87, and the first crystal phases have a density of 4.26. Moreover, KCl (refractive index: 1.64)-CsI described in Japanese Patent Laid-Open No. 2012-131964 has a refractive index ratio of 0.83, and the first crystal phases have a density of 1.99. In contrast, Rb2SO4-CsI, which is an example of this embodiment, has a refractive index ratio of 0.84, and the first crystal phases have a density of 3.65. Furthermore, K2SO4-CsI, which is an example of this embodiment, has a refractive index ratio of 0.83, and the first crystal phases have a density of 2.67. In addition, Na2SO4-CsI has a refractive index ratio of 0.82, and the first crystal phases have a density of 2.70. In conclusion, K2SO4-CsI and Na2SO4-CsI have the same refractive index ratio as KCl—CsI and have higher densities of the first crystal phases than that of KCl—CsI.

The same is true for the CsBr-system phase-separated scintillator crystals. NaCl (refractive index: 1.55)-CsBr (refractive index: 1.70) described in Japanese Patent Laid-Open No. 2012-131964 has a refractive index ratio of 0.91, and the first crystal phases have a density of 2.17. In contrast, Cs2SO4-CsBr, which is an example of this embodiment, has a refractive index ratio of 0.92, and the first crystal phases have a density of 4.26. Rb2SO4-CsBr has a refractive index ratio of 0.89, and the first crystal phases have a density of 3.65. K2SO4-CsBr has a refractive index ratio of 0.88, and the first crystal phases have a density of 2.67. Na2SO4-CsBr has a refractive index ratio of 0.87, and the first crystal phases have a density of 2.70. These phase-separated scintillator crystals have the same refractive index ratio as NaCl—CsBr and have higher densities of the first crystal phases than that of NaCl—CsBr.

The same is true for the RbI-system phase-separated scintillator crystals. NaCl (refractive index: 1.55)-RbI (refractive index: 1.61) described in Japanese Patent Laid-Open No. 2012-131964 has a refractive index ratio of 0.96, and the first crystal phases have a density of 2.17. In contrast, Rb2SO4-RbI, which is an example of this embodiment, has a refractive index ratio of 0.94, and the first crystal phases have a density of 3.65. K2SO4-RbI has a refractive index ratio of 0.93, and the first crystal phases have a density of 2.67. Na2SO4-RbI has a refractive index ratio of 0.92, and the first crystal phases have a density of 2.70. These phase-separated scintillator crystals have the same refractive index ratio as NaCl—RbI and have higher densities of the first crystal phases than that of NaCl—RbI.

Radiation absorptivity depends on not only density but also the atomic number of a component material and the energy of radiation. Alkali metal elements are commonly used as the material contained in the first crystal phases. Thus, a higher density has a tendency to lead to higher radiation absorptivity.

As described above, the phase-separated scintillator crystal according to this embodiment has high radiation absorptivity, compared with traditional phase-separated scintillator crystals having comparable light-guiding properties. It is thus possible to inhibit the incidence of radiation on a light-receiving device. Therefore, light emitted from CsI, CsBr, or RbI by irradiation with radiation is efficiently propagated. Moreover, it is possible to reduce radiation passing through the low-refractive-index phases to reduce the damage of the light-receiving device by radiation, thereby resulting in high radiation resistance.

Production of Scintillator Crystal

The scintillator crystal according to this embodiment is produced by the use of the fact that the material contained in the first crystal phases and the material contained in the second crystal phase form a eutectic phase-separated structure. To form the eutectic phase-separated structure of the first crystal phases and the second crystal phase, a material system having a eutectic composition may be melted and solidified so as to have unidirectionality. In particular, the temperature gradient is required to be controlled in such a manner that the liquid-solid interface is flat. The temperature gradient may be set to about 30° C./mm or more. To prevent the occurrence of cracking and so forth of the crystal due to thermal stress, the temperature gradient may be lowered to the extent that the formation of the foregoing structure is not adversely affected. A portion that has already been formed into a crystal may be reheated to the extent that the portion is not melted, in order to inhibit the occurrence of cracking and so forth. A correlation inherent in material systems holds among the composition range in which the eutectic phase-separated structure can be formed, the temperature gradient, and the solidification rate. In an embodiment of the present invention and in this specification, a phase-separated structure produced in what is called the eutectic coupled zone is referred to as a eutectic phase-separated structure. That is, in the case where a phase-separated structure is simultaneously formed by solidification, even if the structure has a composition ratio deviating from a eutectic composition ratio, the structure is defined as a eutectic phase-separated structure. In addition, the simultaneous solidification of the material for the first crystal phases and the material for the second crystal phase is referred to as "eutectic".

Figure 2A:
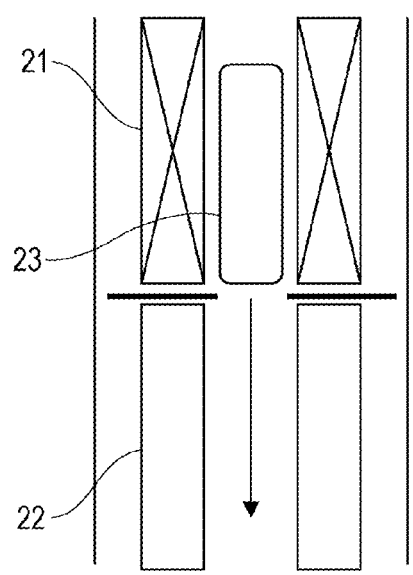
FIG. 2A is a schematic cross-sectional view of an example of an apparatus for producing a scintillator crystal according to an embodiment.
Figure 2B:
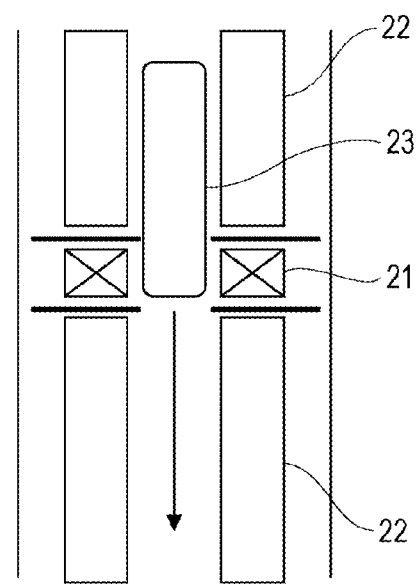
FIG. 2B is a schematic cross-sectional view of an example of an apparatus for producing a phase-separated scintillator crystal according to an embodiment.

As illustrated in FIGS. 2A and 2B, in the Bridgman technique used in apparatuses for forming scintillator crystals, a sample enclosed in, for example, a cylindrical silica tube in order not to oxidize a material is vertically placed. The position of the solidification interface may be controlled by moving a heater or the sample at a constant speed. Thereby, the scintillator according to this embodiment may be produced. As illustrated in FIG. 2A, in particular, the apparatus includes a heater section 21 having a length equal to or more than the length of the sample 23; and a water cooling section 22 configured to achieve a temperature gradient of 30° C./mm at the solid-liquid interface. As illustrated in FIG. 2B, a structure may be used in which water cooling sections 22 are arranged in upper and lower portions and the heater section 21 covers only part of the sample 23. Moreover, another production method equivalent to the foregoing methods may be employed.

The scintillator crystal may also be produced by a process, such as the Czochralski process, including pulling a crystal from a melt. In this case, unlike the Bridgman technique, the solidification is not performed in the sample container. Thus, the solid-liquid interface may be formed without being influenced by the wall of the container. Furthermore, a floating zone method may be employed for the production.

In particular, in the Bridgman technique, the solidification rate needs to be set so as to make the solid-liquid interface of the sample as flat as possible, this depends on the diameter of the sample. Specifically, when the sample has a large diameter, the heat exchange takes a long time. The solid-liquid interface is markedly curved if a low solidification rate is not used. As a result, curved columnar crystals serving as the first crystal phases 11 are formed in most regions of the sample. The reason for this is that the growth direction of the columnar crystals is substantially perpendicular to the solid-liquid interface. Furthermore, when the solidification rate is higher with respect to the size of the sample, the solid-liquid interface is not flat or smooth, thereby forming micro-undulations to lead to the formation of dendrites. It is thus important to avoid this situation. Therefore, a sufficient temperature gradient may be set at the solid-liquid interface, and the solidification rate is preferably 850 mm/hour or less. The solidification rate is more preferably 500 mm/hour or less and particularly preferably 300 mm/hour or less.

The diameter and the period of the first crystal phases 11 of the scintillator crystal depend on the solidification rate. In particular, regarding the period of the columnar crystals, a correlation represented by the following expression holds: $\lambda 2 \cdot v$=constant, where $\lambda$ represents the period, and v represents the solidification rate. Thus, when a desired structural period is present, the solidification rate is inevitably and roughly limited by the correlation. Meanwhile, a solidification rate at which a flat, smooth solid-liquid interface is formed is determined, depending on the limitation of the production method. Thus, the period $\lambda$ is 500 nm or more and 50 µm or less. The diameter of each of the columnar crystals is 50 nm or more and 30 µm or less in response to the range of the period.

Here, each of the columnar crystals may not have a circular cross-sectional shape. When each of the columnar crystals has an indefinite cross-sectional shape, the shortest diameter thereof is within the range described above. The average value of the ratios of the maximum diameters to the minimum diameters may be 10 or less. When the ratio is more than 10, the structure is appropriately regarded as a lamella structure. However, even if some columnar crystals have a ratio more than 10, the average value may be 10 or less.

In consideration of the production conditions, the phase-separated structure tends to have the lamellar structure when the molar ratio of the materials of the two phases is closer to 1:1. Thus, the production conditions and the additives may be selected in order not to form the lamellar structure.

The composition of starting materials fed for the production of a scintillator crystal will be described below. The composition ratio of the scintillator is often within the range of ±5% by mole with respect to the value described in Table 1. The composition fed may deviate from the range of ±5% by mole with respect to the eutectic composition ratio. Specifically, in the Bridgman technique, when the composition is completely melted and then solidified unidirectionally, an excessive amount of a material that deviates from the eutectic composition is first precipitated in the initial stage of the solidification, so that the remaining melt has the eutectic composition. In the Czochralski process, an excessive amount of a material that deviates from the eutectic composition is pulled in the initial stage of pulling. Thus, the excessive amount of a material that deviates from the eutectic composition is pulled in advance to solidify the material, thereby resulting in the melt having the eutectic composition. Thereafter, pulling may be performed again. After the production of the crystal, an unnecessary portion may be cut off.

Application of Phase-Separated Scintillator

The phase-separated scintillator crystal according to this embodiment may be used as a radiation detector for use in, for example, medical, industrial, high-energy physical, and aerospace fields in combination with a photodetector. In particular, the phase-separated scintillator crystal has a light-guiding function without providing a partition and thus may be used in a situation where light needs to be guided in a specific direction toward a photodetector. Moreover, the phase-separated scintillator crystal may be used in an X-ray CT scanner that requires the formation of a partition or may be used as an alternative for the CsI needle crystal of an X-ray flat panel detector (FPD). In these cases, the light emission wavelength of the scintillator may be adjusted so as to be matched to the photoreceptive sensitivity of the detector. The adjustment of the light emission wavelength may be performed by the addition of additives and a component serving as a luminescent center to the second crystal phase.

The photodetector and the phase-separated scintillator crystal may be arranged so as to be in direct contact with each other. Alternatively, the photodetector and the phase-separated scintillator crystal may be arranged with a layer having functions, such as the protection of the photodetector and antireflection.

EXAMPLES

Example 1

This example relates to the production of the scintillator according to the foregoing embodiment.

Figure 3B:
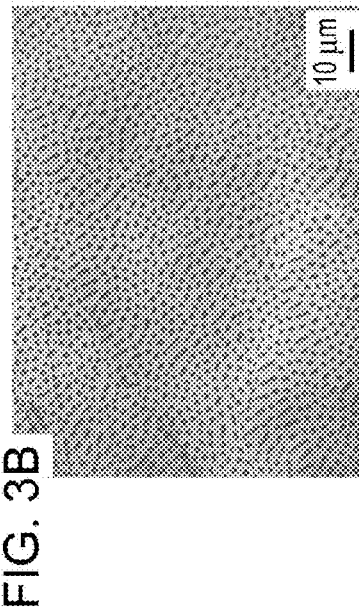
FIG. 3B is an optical transmission image of a CsI—Rb2SO4-system scintillator crystal according to Example 1.
Figure 3D:
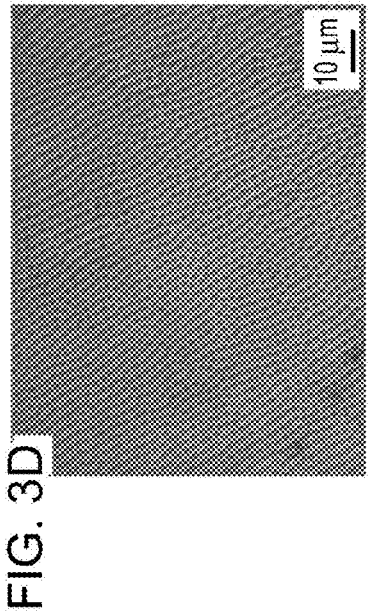
FIG. 3D is an optical transmission image of a CsI—Na2SO4-system scintillator crystal according to Example 1.
Figure 3A:
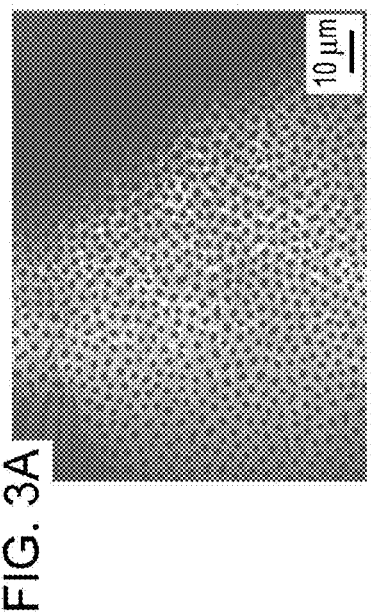
FIG. 3A is an optical transmission image of a CsI—Cs2SO4-system scintillator crystal according to Example 1.
Figure 3C:
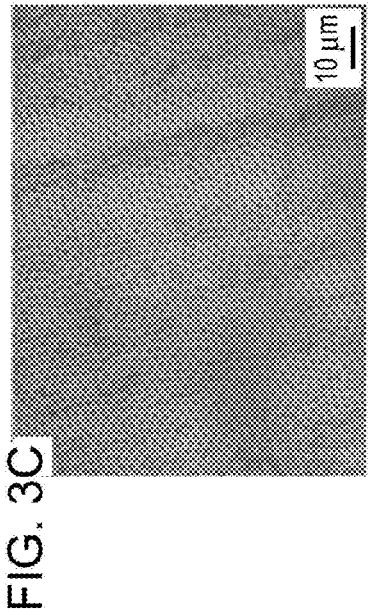
FIG. 3C is an optical transmission image of a CsI—K2SO4-system scintillator crystal according to Example 1.

CsI was mixed with $Cs_2SO_4$, $Rb_2SO_4$, $K_2SO_4$, and $Na_2SO_4$ in amounts of 13% by mole, 15% by mole, 15% by mole, and 16% by mole, respectively, with respect to CsI, thereby preparing $Cs_2SO_4$-CsI, $Rb_2SO_4$-CsI, $K_2SO_4$-CsI, and $Na_2SO_4$-CsI systems. Each of the systems was vacuum-sealed in a silica tube to provide a sample. Each of the samples was arranged in a Bridgman furnace as illustrated in the schematic drawing of FIG. 2A. The temperature was raised to 800° C. After the entire sample was melted, the molten state was held for 30 minutes. Each sample was pulled down to gradually solidify the sample from the lower portion of the sample. When the sample was pulled down and placed in the water cooling section where cooling water was circulated, a temperature difference between the molten portion and the portion of the sample in the water cooling section was set to 30° C./mm or more. The resulting four crystals were cut and observed with an optical microscope in a transmission arrangement. The results demonstrated that the CsI—$Cs_2SO_4$ system had a satisfactory structure of a surface perpendicular to the direction of solidification as illustrated in FIG. 3A. Similarly, the CsI—$Rb_2SO_4$, CsI—$K_2SO_4$, CsI—$Na_2SO_4$ systems each had a satisfactory structure of a surface perpendicular to the direction of solidification as illustrated in FIGS. 3B, 3C, and 3D.

Observation of these samples with a scanning electron microscope (SEM) revealed that the columnar crystals extended in each of the structures in the direction parallel to the solidification direction. Analysis of the samples with a composition analyzer equipped with the SEM demonstrated that the columnar crystals of each of the samples were composed of $Cs_2SO_4$, $Rb_2SO_4$, $K_2SO_4$, or $Na_2SO_4$ and that portions around the columnar crystals were composed of CsI. The results demonstrated that it was possible to produce the structure in which many columnar crystals extended unidirectionally and were surrounded by CsI. FIGS. 3A to 3D are images under transmitted light. The regions of the high-refractive-index phase CsI were observed as bright images. As expected, it was confirmed that light was guided.

The densities of the sulfates serving as the low-refractive-index phases (first crystal phases) of the four samples were 4.26 for the CsI—$Cs_2SO_4$ system, 3.65 for the CsI—$Rb_2SO_4$ system, 2.67 for the CsI—$K_2SO_4$ system, and 2.70 for the CsI—$Na_2SO_4$ system. As described above, different material systems have different densities of the low-refractive-index phases. $Cs_2SO_4$ and $Rb_2SO_4$ serving as the low-refractive-index phases with high densities may be used in view of the damage of a light-receiving device by radiation. However, the effect of the density of the low-refractive-index phase is defined from the viewpoint of achieving the resistance of a light-receiving device to radiation. Thus, the system may be appropriately selected, depending on intended use.

The X-ray excited emission spectrum of the CsI—$Cs_2SO_4$-system sample selected from the produced samples was measured. The results demonstrated that the sample functioned as a scintillator.

The volume ratios of the columnar crystals to the CsI portions of the four samples were studied. In the CsI—$Cs_2SO_4$ system, the volume ratio of $Cs_2SO_4$ was about 18% by volume. In the CsI—$Rb_2SO_4$ system, the volume ratio of $Rb_2SO_4$ was about 19% by volume. In the CsI—$K_2SO_4$ system, the volume ratio of $K_2SO_4$ was about 13% by volume. In the CsI—$Na_2SO_4$ system, the volume ratio of $Na_2SO_4$ was about 14% by volume. Accordingly, the different material systems had different volume ratios. The volume ratio of the first crystal phases affects the light-guiding properties. That is, a higher volume ratio of the first crystal phases results in higher light-guiding properties. The amount of light emitted decreases with increasing volume ratio. Thus, the system may be appropriately selected, depending on intended use.

This example revealed that the scintillator, in which the first crystal phases were composed of $Cs_2SO_4$, $Rb_2SO_4$, $K_2SO_4$, or $Na_2SO_4$ and in which the second crystal phase was composed of CsI, according to the foregoing embodiment served as a scintillator crystal having phase-separated structure.

Example 2

As with Example 1, this example relates to the production of the scintillator according to the foregoing embodiment.

Figure 3F:
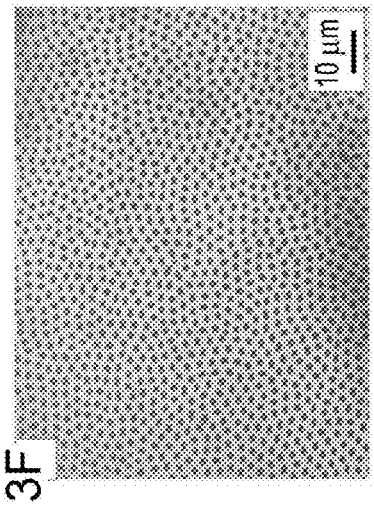
FIG. 3F is an optical transmission image of a CsBr—Rb2SO4-system scintillator crystal according to Example 2.
Figure 3H:
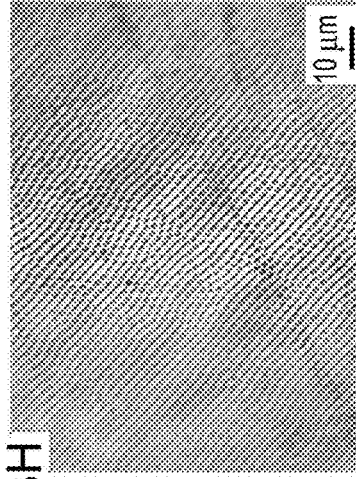
FIG. 3H is an optical transmission image of a CsBr—Na2SO4-system scintillator crystal according to Example 2.
Figure 3E:
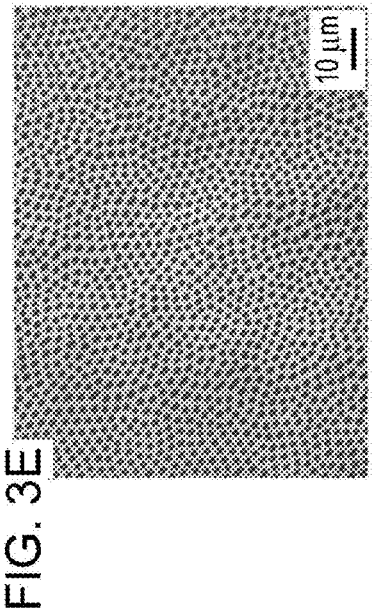
FIG. 3E is an optical transmission image of a CsBr—Cs2SO4-system scintillator crystal according to Example 2.
Figure 3G:
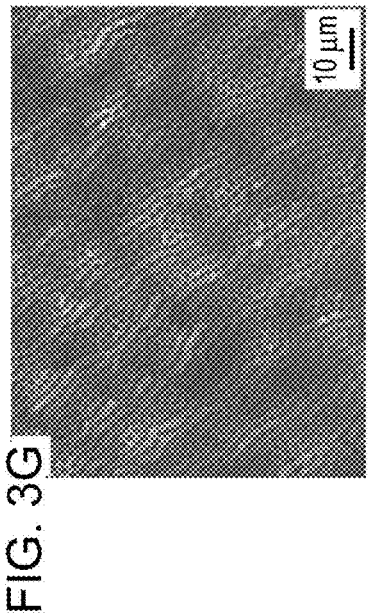
FIG. 3G is an optical transmission image of a CsBr—K2SO4-system scintillator crystal according to Example 2.

CsBr was mixed with $Cs_2SO_4$, $Rb_2SO_4$, $K_2SO_4$, and $Na_2SO_4$ in amounts of 11% by mole, 17% by mole, 15% by mole, and 23% by mole, respectively, with respect to CsBr, thereby preparing CsBr—$Cs_2SO_4$, CsBr—$Rb_2SO_4$, CsBr—$K_2SO_4$, and CsBr—$Na_2SO_4$ systems. Each of the systems was vacuum-sealed in a silica tube to provide a sample. Each of the samples was arranged in a Bridgman furnace as illustrated in the schematic drawing of FIG. 2A. The temperature was raised to 800° C. After the entire sample was melted, the molten state was held for 30 minutes. Each sample was pulled down to gradually solidify the sample from the lower portion of the sample. When the sample was pulled down and placed in the water cooling section where cooling water was circulated, a temperature difference between the molten portion and the portion of the sample in the water cooling section was set to 30° C./mm or more. The resulting four crystals were cut and observed with an optical microscope in a transmission arrangement. The results demonstrated that the CsBr—$Cs_2SO_4$ system had a satisfactory structure of a surface perpendicular to the direction of solidification as illustrated in FIG. 3E. Similarly, the CsBr—$Rb_2SO_4$, CsBr—$K_2SO_4$, and CsBr—$Na_2SO_4$ systems each had a satisfactory structure of a surface perpendicular to the direction of solidification as illustrated in FIGS. 3F, 3G, and 3H.

Observation of these samples with a scanning electron microscope (SEM) revealed that the columnar crystals extended in each of the structures in the direction parallel to the solidification direction. Analysis of the samples with a composition analyzer equipped with the SEM demonstrated that the columnar crystals of each of the samples were composed of Cs2SO4, Rb2SO4, K2SO4, or Na2SO4 and that portions around the columnar crystals were composed of CsBr. The results demonstrated that it was possible to produce the structure in which many columnar crystals extended unidirectionally and were surrounded by CsBr. FIGS. 3A to 3D are images under transmitted light. The regions of the high-refractive-index phase CsBr were observed as bright images. As expected, it was confirmed that light was guided.

The densities of the sulfates serving as the low-refractive-index phases of the four samples were 4.26 for the CsBr—Cs2SO4 system, 3.65 for the CsBr—Rb2SO4 system, 2.67 for the CsBr—K2SO4 system, and 2.70 for the CsBr—Na2SO4 system. As described above, different material systems have different densities of the low-refractive-index phases. Cs2SO4 and Rb2SO4 serving as the low-refractive-index phases with high densities may be used in view of the damage of a light-receiving device by radiation. However, the effect of the density of the low-refractive-index phase is defined from the viewpoint of achieving the resistance of a light-receiving device to radiation. Thus, the system may be appropriately selected, depending on intended use.

The volume ratios of the columnar crystals to the CsBr portions of the four samples were studied. In the CsBr—Cs2SO4 system, the volume ratio of Cs2SO4 was about 18% by volume. In the CsBr—Rb2SO4 system, the volume ratio of Rb2SO4 was about 24% by volume. In the CsBr—K2SO4 system, the volume ratio of K2SO4 was about 20% by volume. In the CsBr—Na2SO4 system, the volume ratio of Na2SO4 was about 25% by volume. Accordingly, the different material systems had different volume ratios.

As with Example 1, the X-ray excited emission spectra of the produced four samples, the CsBr—Cs2SO4 system, the CsBr—Rb2SO4 system, the CsBr—K2SO4 system, and the CsBr—Na2SO4 system, were measured. The results demonstrated that these samples functioned as scintillators.

This example revealed that the scintillator according to the foregoing embodiment, the scintillator including the first crystal phases composed of Cs2SO4, Rb2SO4, K2SO4, or Na2SO4 and the second crystal phase composed of CsBr, served as a scintillator crystal having a phase-separated structure.

Example 3

As with Examples 1 and 2, this example relates to the production of the scintillator according to the foregoing embodiment.

Figure 4A:
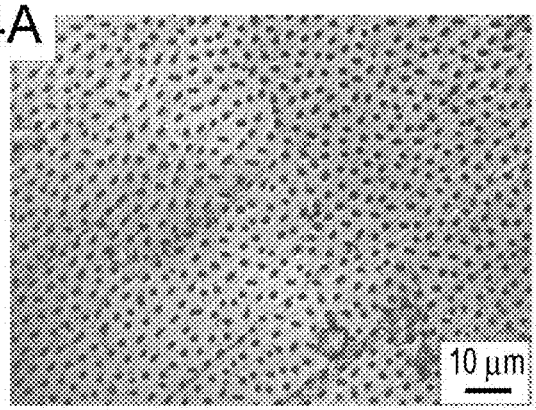
FIG. 4A is an optical transmission image of a RbI—Rb2SO4-system scintillator crystal according to Example 3.
Figure 4B:
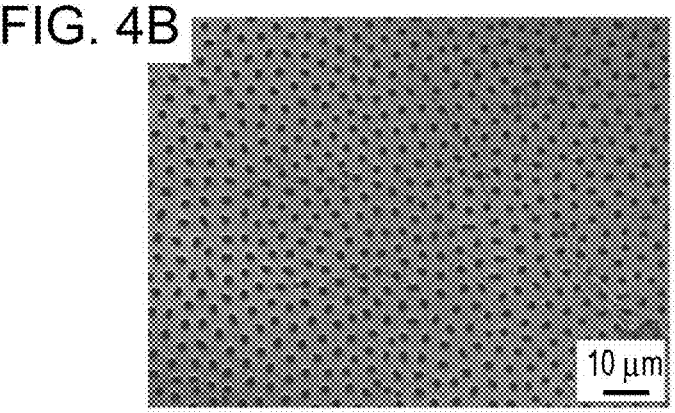
FIG. 4B is an optical transmission image of a RbI—K2SO4-system scintillator crystal according to Example 3.
Figure 4C:
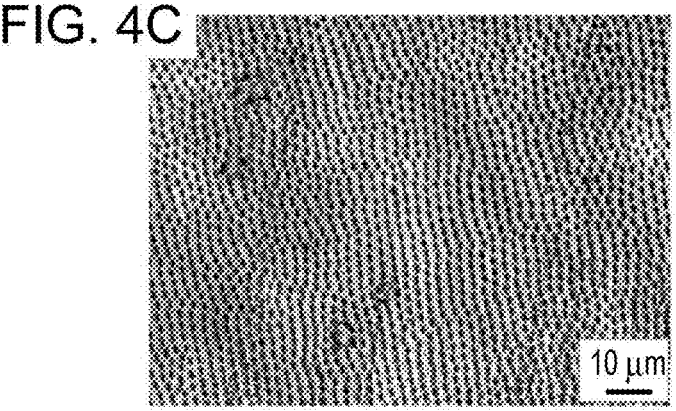
FIG. 4C is an optical transmission image of a CsBr—Na2SO4-system scintillator crystal according to Example 3.

RbI was mixed with Rb2SO4, K2SO4, and Na2SO4 in amounts of 11% by mole, 14% by mole, and 22% by mole, respectively, with respect to RbI, thereby preparing RbI—Rb2SO4, RbI—K2SO4, and RbI—Na2SO4 systems. Each of the systems was vacuum-sealed in a silica tube to provide a sample. Each of the samples was arranged in a Bridgman furnace as illustrated in the schematic drawing of FIG. 2A. The temperature was raised to 800° C. After the entire sample was melted, the molten state was held for 30 minutes. Each sample was pulled down to gradually solidify the sample from the lower portion of the sample. When the sample was pulled down and placed in the water cooling section where cooling water was circulated, a temperature difference between the molten portion and the portion of the sample in the water cooling section was set to 30° C./mm or more. The resulting three crystals were cut and observed with an optical microscope in a transmission arrangement. The results demonstrated that the RbI—Rb2SO4 system had a satisfactory structure of a surface perpendicular to the direction of solidification as illustrated in FIG. 4A. Similarly, the RbI—K2SO4 and CsBr—Na2SO4 systems each had a satisfactory structure of a surface perpendicular to the direction of solidification as illustrated in FIGS. 4B and 4C.

Observation of these samples with a scanning electron microscope (SEM) revealed that the columnar crystals extended in each of the structures in the direction parallel to the solidification direction. Analysis of the samples with a composition analyzer equipped with the SEM demonstrated that the columnar crystals of each of the samples were composed of Rb2SO4, K2SO4, or Na2SO4 and that portions around the columnar crystals were composed of RbI. The results demonstrated that it was possible to produce the structure in which many columnar crystals extended unidirectionally and were surrounded by RbI. FIGS. 4A to 4C are images under transmitted light. The regions of the high-refractive-index phase RbI were observed as bright images. As expected, it was confirmed that light was guided.

In the three samples, the densities of the sulfates serving as the low-refractive-index phases with respect to the high-refractive-index phase RbI were 3.65 for the RbI—Rb2SO4 system, 2.67 for the RbI—K2SO4 system, and 2.70 for the RbI—Na2SO4 system. As described above, different material systems have different densities of the low-refractive-index phases. Rb2SO4 serving as the low-refractive-index phase with a high density may be used in view of the damage of a light-receiving device by radiation. However, the effect of the density of the low-refractive-index phase is defined from the viewpoint of achieving the resistance of a light-receiving device to radiation. Thus, the system may be appropriately selected, depending on intended use.

As with Examples 1 and 2, the X-ray excited emission spectra of the produced three samples, the RbI—Rb2SO4 system, the RbI—K2SO4 system, and the RbI—Na2SO4 system, were measured. The results demonstrated that these samples functioned as scintillators.

The volume ratios of the columnar crystals to the RbI portions of the three samples were studied. In the RbI—Rb2SO4 system, the volume ratio of Rb2SO4 was about 13% by volume. In the RbI—K2SO4 system, the volume ratio of K2SO4 was about 16% by volume. In the RbI—Na2SO4 system, the volume ratio of Na2SO4 was about 20% by volume. Accordingly, the different material systems had different volume ratios.

This example revealed that the scintillator according to the foregoing embodiment, the scintillator including the first crystal phases composed of Rb2SO4, K2SO4, or Na2SO4 and the second crystal phase composed of RbI, served as a scintillator crystal having a phase-separated structure.

Example 4

This example relates to a radiation detector including the scintillator described in Examples 1, 2, or 3.

As an example, the CsI—Cs2SO4 system was selected from the material systems described in the embodiment. A scintillator crystal having a thickness of 500 μm was cut out and disposed on a photodetector in such a manner that columnar crystals were arranged substantially vertically, thereby providing a radiation detector. The scintillator crystal of the radiation detector was irradiated with an X-ray beam having a spot diameter of 50 μm. It was found from the output of the photodetector that the divergence of light was sufficiently inhibited, compared with single-crystal CsI. In the case where a resin was used to bond the scintillator crystal and the photodetector, it was found that a state in which the divergence of light was inhibited was maintained. Accordingly, the results demonstrated that even when a layer composed of another material was provided between the scintillator crystal according to the embodiment and the photodetector, it was possible to produce the radiation detector.

Here, in order to study the damage of a light-receiving device by radiation when the CsI—Cs2SO4-system scintillator crystal was used, the X-ray transmittance of the scintillator crystal was evaluated. The CsI—Cs2SO4-system scintillator crystal had a thickness of 500 μm as described above. When the CsI—Cs2SO4-system scintillator crystal was irradiated with X-rays under X-ray radiation quality RQA 5, the X-ray transmittance of the CsI—Cs2SO4-system scintillator crystal was 6.2%.

COMPARATIVE EXAMPLE

A CsI—NaCl system, which serves as a phase-separated scintillator crystal having a refractive index ratio equivalent to that of the CsI—Cs2SO4 system, was used as a comparative example. The X-ray transmittance of the scintillator crystal was evaluated. In this comparative example, the CsI—NaCl-system scintillator crystal also had a thickness of 500 μm. As with the CsI—Cs2SO4 system, when the CsI—NaCl-system scintillator crystal was irradiated with X-rays under X-ray radiation quality RQA 5, the X-ray transmittance of the CsI—NaCl-system scintillator crystal was 21.2%.

The results demonstrated that the scintillator as an example of the foregoing embodiment, the scintillator including the first crystal phases composed of Cs2SO4 and the second crystal phase composed of CsI, had superior radiation resistance to the scintillator including the first crystal phases composed of NaCl and the second crystal phase composed of CsI.

In conclusion, the foregoing results demonstrated that the scintillator according to the embodiment, the scintillator including the first crystal phases composed of the sulfate and the second crystal phase composed of the alkali halide that emits light by irradiation with radiation, had high radiation absorptivity, compared with traditional scintillators having comparable light-guiding properties (refractive index ratios).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-201376 filed Sep. 27, 2013, which is hereby incorporated by reference herein in its entirety.

What is claimed is:

1. A scintillator crystal comprising:
    a plurality of first crystal phases; and
    a second crystal phase located around the plurality of the first crystal phases,
    wherein each of the plurality of the first crystal phases contains a sulfate,
    the second crystal phase contains an alkali halide that emits light by irradiation with radiation, and
    the refractive index of each of the first crystal phases is lower than the refractive index of the second crystal phase.

2. The scintillator crystal according to claim 1, wherein the composition ratio of a material contained in the first crystal phases to a material contained in the second crystal phase is a composition ratio of the material contained in the first crystal phases to the material contained in the second crystal phase at a eutectic point.

3. The scintillator crystal according to claim 2, wherein the composition ratio of the first crystal phases to the second crystal phase falls within the range of ±5% by mole with respect to the composition ratio at the eutectic point.

4. The scintillator crystal according to claim 1, wherein each of the plurality of the first crystal phases contains, as the sulfate, at least one of $Cs_2SO_4$, $Rb_2SO_4$, $K_2SO_4$, and $Na_2SO_4$.

5. The scintillator crystal according to claim 1, wherein the second crystal phase contains, as the alkali halide that emits light by irradiation with radiation, at least one of CsI, CsBr, and RbI.

6. The scintillator crystal according to claim 1, further comprising:
    a first surface; and
    a second surface,
    wherein the first surface and the second surface are not flush with each other,
    each of the plurality of the first crystal phases is continuously present from the first surface to the second surface, and
    the second crystal phase is continuously present from the first surface to the second surface.

7. The scintillator crystal according to claim 1, wherein each of the first crystal phases is composed of the sulfate and contains a material other than the sulfate in an amount of 1% by mole or less.

8. The scintillator crystal according to claim 1, wherein the second crystal phase is composed of the alkali halide and contains a material other than the alkali halide in an amount of 1% by mole or less.

9. The scintillator crystal according to claim 8, wherein the material other than the alkali halide serves as a luminescent center.

10. The scintillator crystal according to claim 1, wherein a refractive index ratio is defined by dividing the refractive index of the first crystal phases by the refractive index of the second crystal phase and is 0.94 or less.

11. A radiation detector comprising:
    the scintillator crystal according to claim 1; and
    a photodetector configured to detect light emitted from the scintillator crystal.

12. The radiation detector according to claim 11, wherein the scintillator crystal and the photodetector are disposed with at least one layer.

* * * * *